United States Patent [19]

Sugaya et al.

[11] Patent Number: 5,480,953

[45] Date of Patent: Jan. 2, 1996

[54] HYDROPHILIC MATERIAL AND SEMIPERMEABLE MEMBRANE MADE THEREFROM

[75] Inventors: Hiroyuki Sugaya; Masahiro Minaga, both of Otsu; Ryozo Terada, Kamakura; Toshikazu Tayama, Otsu; Kazumi Tanaka, Otsu; Fumiaki Fukui, Otsu, all of Japan

[73] Assignee: Toray Industries, Inc., Tokyo, Japan

[21] Appl. No.: 244,555

[22] PCT Filed: Sep. 28, 1993

[86] PCT No.: PCT/JP93/01378

§ 371 Date: Jul. 27, 1994

§ 102(e) Date: Jul. 27, 1994

[87] PCT Pub. No.: WO94/07931

PCT Pub. Date: Apr. 14, 1994

[30] Foreign Application Priority Data

Sep. 29, 1992 [JP] Japan ................................. 4-285540

[51] Int. Cl.$^6$ .................................................. C08F 20/26
[52] U.S. Cl. .................. 526/320; 526/329.5; 526/329.6
[58] Field of Search ........................... 526/320, 329.5, 526/329.6

[56] References Cited

U.S. PATENT DOCUMENTS

| 5,216,101 | 6/1993 | Kawanaka et al. | |
| 5,281,683 | 1/1994 | Yano et al. | 526/320 |
| 5,290,411 | 3/1994 | Zewert et al. | 526/320 |
| 5,349,036 | 9/1994 | Simpson et al. | 526/320 |

FOREIGN PATENT DOCUMENTS

| 61-231081 | 10/1986 | Japan | 526/320 |
| 4142312 | 5/1992 | Japan | 526/320 |

*Primary Examiner*—Joseph L. Schofer
*Assistant Examiner*—N. Sarofim
*Attorney, Agent, or Firm*—Evenson, McKeown, Edwards & Lenahan

[57] ABSTRACT

Disclosed is a hydrophilic material characterized in that the material comprises a copolymer composed of a monomer (A) having a polyalkylene oxide unit and a polymerizable carbon-carbon double bond in its molecule, a methacrylic ester monomer or an acrylic ester monomer (B) and a monomer (C) having a polymerizable carbon-carbon double bond other than the monomers (A) and (B), and the content of the monomer (C) is not less than 5% by weight and not more than 90% by weight, and a semipermeable membrane made therefrom. The present invention provides a hydrophilic material which can be dissolved in a solvent, can be easily formed and is excellent in antithrombotic and antifouling properties, and further provides an antithrombotic material and a semipermeable membrane. These materials can be appropriately used in the medical field and as water-absorbent and antifouling materials.

18 Claims, 5 Drawing Sheets

HYDROPHILIC MATERIAL AND SEMIPERMEABLE MEMBRANE MADE THEREFROM

TECHNICAL FIELD OF THE INVENTION

The present invention relates to a novel hydrophilic material and a semipermeable membrane made therefrom. The material can be appropriately used as antithrombotic materials etc. in the medical field and as water-absorbent materials and antifouling materials.

BACKGROUND ART OF THE INVENTION

Recently, application of polymer materials to the industrial and medical fields has been developed, and many hydrophilic polymer materials have been used. Particularly, they have been used as polymer materials insoluble to water and having a water-absorbent property, various membranes having a substance-permeable property, catheters, cannulas, sanitary materials, contact lenses, blood preserving containers, blood circuits, cell culture media, or capsules or fixing substrates for enzymes or medicines. Further, such materials can be applied not only to the medical field but also to supports for cataphoresis or liquid chromatography and various coating materials or materials for foods for preventing from fouling or clouding.

In such uses, antifouling property frequently becomes an important factor to the durability and quality of the materials. Especially, in a case where these membranes are used for medical care and brought into contact with blood or body fluid, material components such as platelets, leucocytes, erythrocytes and fibroblasts inevitably adhere thereto, and there are fears that these adhered components generate a thrombus on a surface of a membrane coming into contact with blood and that the components affect a complement. As a result, formation of a thrombus or reduction of an immunity function is presumed to be caused.

As means for solving these problems, a hydrophilic copolymer containing a polyethylene oxide chain was invented (JP-A-SHO-57-164064), and a selectively permeable hollow fiber composed of a copolymer containing an ethylene oxide chain was invented (JP-A-SHO-60-22901). Further, it was found that a semipermeable membrane composed of a hydrophilic acrylonitrile copolymer containing a polyethylene oxide chain and acrylonitrile was excellent in solute permeability and antifouling property (JP-A-SHO-63-130103). Furthermore, a plasma separative membrane excellent in compatibility with blood, which was composed of a mixture of a copolymer containing an ethylene oxide chain and isotactic methyl methacrylate polymer, was invented.

However, in a process for synthesizing a hydrophilic copolymer containing a polyalkylene oxide chain, when copolymerized with an acrylic or methacrylic ester, in a case where the content of polyalkylene oxide in the copolymer is too high, there is a problem that the synthesized copolymer becomes a gel state in spite of the kind of the acrylic or methacrylic ester and it can be hardly dissolved in a solvent. In such a case, it cannot be used as a coating material and cannot be formed as a fiber or a membrane.

Further, even if the content of polyalkylene oxide is low, because the water content of the copolymer copolymerized with acrylic ester or methacrylic ester is low, for example, as compared with that of a copolymer copolymerized with polyacrylonitrile, satisfactory antifouling property and antithrombotic property have not been able to be obtained. As the result of our earnest research to improve the gel structure, a polymer, which can be easily dissolved in a solvent, which has a high water content and which has a high affinity with acrylic ester or methacrylic ester, has been obtained by copolymerizing an acrylic ester or methacrylic ester, polyalkylene oxide and another copolymerizable component.

An object of the present invention is to provide a hydrophilic material which can be dissolved in a solvent and easily molded and which is excellent in antithrombotic property and antifouling property, and further to provide excellent antithrombotic material and semipermeable membrane.

DISCLOSURE OF THE INVENTION

To accomplish the above object, the present invention has the following constitution.

Namely, the present invention provides a hydrophilic material characterized in that the material comprises a copolymer composed of a monomer (A) having a polyalkylene oxide unit and a polymerizable carbon-carbon double bond in its molecule, a methacrylic ester monomer or an acrylic ester monomer (B) and a monomer (C) having a polymerizable carbon-carbon double bond other than the monomer (A) and monomer (B), and the content of the monomer (C) is not less than 5% by weight and not more than 90% by weight.

Further, the present invention provides a semipermeable membrane comprising a copolymer composed of a monomer (A) having a polyalkylene oxide unit and a polymerizable carbon-carbon double bond in its molecule, a methacrylic ester monomer or an acrylic ester monomer (B) and a monomer (C) having a polymerizable carbon-carbon double bond other than the monomer (A) and monomer (B), the total content of the monomer (C) in the copolymer being not less than 5% by weight and not more than 90% by weight; and a methacrylic ester polymer or an acrylic ester polymer.

THE BEST MODE FOR CARRYING OUT THE INVENTION

Figure 1:
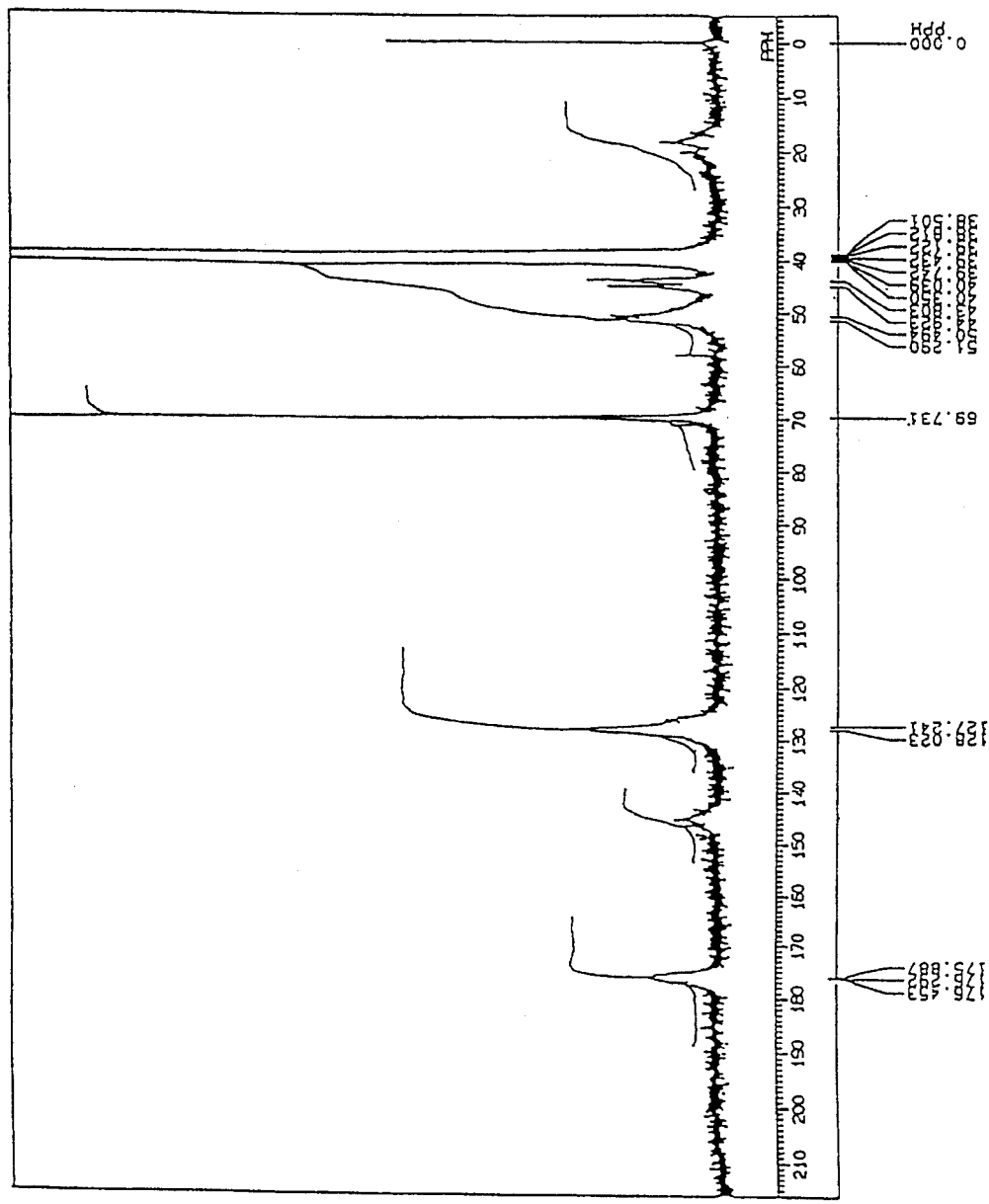
FIG. 1 is a NMR chart with respect to a copolymer of Example 1.

Although the monomer (A) having a polyalkylene oxide unit and a polymerizable carbon-carbon double bond in its molecule according to the present invention is not particularly restricted, for example, an acrylic or methacrylic ester represented by the following chemical formula (1) or a vinyl monomer represented by the following chemical formula (2) can be employed.

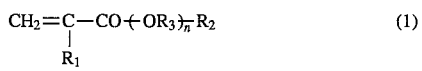

(1)

(Where, "n" represents an integer of not less than 5, "$R_1$" represents H or $CH_3$, "$R_2$" is selected from the group consisting of a hydroxyl group, an alkoxy group of $C_1$ to $C_4$ and $OCH\phi_2$ ("$\phi$" represents a phenyl group), and "$R_3$" represents an alkylene.)

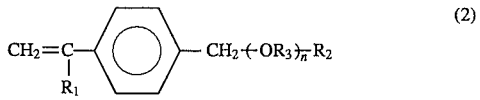

(2)

(Where, "n" represents an integer of not less than 5, "$R_1$" represents H or $CH_3$, "$R_2$" is selected from the group consisting of a hydroxyl group, an alkoxy group of $C_1$ to $C_4$ and $OCH\phi_2$ ("$\phi$" represents a phenyl group), and "$R_3$" represents an alkylene.)

These additional polymerizable compounds can be produced by a known method, they can be easily polymerized by the polymerizable carbon-carbon double bond without using particular apparatus and method, and further, they can be copolymerized with other monomers or macromonomers, and therefore, a polymer composition having a polyalkylene oxide unit can be efficiently prepared with a good reproducibility.

In order to indicate the advantage due to the polyalkylene oxide unit more strongly, the mean polymerization degree of the polyalkylene oxide unit present in the monomer is preferably not less than 5, more preferably not less than 15. Among polyalkylene oxide units, polyethylene oxide unit, polypropylene oxide unit and polyisopropylene unit are preferred. Further, the chain portion composed of polyalkylene oxide unit in the monomer may be a mixture of different kinds of alkylene oxide units. In this case, a chain polymerized with a polyethylene oxide unit and a polypropylene oxide unit one after the other can be exemplified.

The content of the polyalkylene oxide and the mean polymerization degree of the polyalkylene oxide unit in the monomer can be determined by a usual method such as, for example, elemental analysis, infrared absorption spectrum, nuclear magnetic resonance spectrum or gel osmosis chromatography.

Among monomers (A) having a polyalkylene oxide unit and a polymerizable carbon-carbon double bond in an identical molecule, a monomer represented by the chemical formula (1) is preferably used from the viewpoint of easy acquisition. Among such monomers, for example, particularly methoxypolyethylene glycol methacrylate is used broadly for the industry and is preferred because of its high hydrophilic property.

The content of monomer (A) in the copolymer is preferably not less than 10% by weight on the average, more preferably not less than 20% by weight, in order to indicate an antifouling property.

As the methacrylic ester monomer or the acrylic ester monomer (B), for example, an acrylic ester such as acrylic acid, methyl acrylate, ethyl acrylate, propyl acrylate, butyl acrylate, lauryl acrylate, 2-ethylhexyl acrylate, cyclohexyl acrylate or benzizyl acrylate, or a methacrylic ester such as methacrylic acid, methyl methacrylate, ethyl methacrylate, propyl methacrylate, butyl methacrylate, lauryl methacrylate, 2-ethylhexyl methacrylate, cyclohexyl methacrylate or benzizyl methacrylate can be employed. Further, the monomer (B) may be a mixture of these esters.

The monomer (B) is used for the purpose of synthesizing a copolymer insoluble to water by copolymerizing it with the monomer (A). Further, by using the monomer (B), it becomes possible to blend with or coat onto a material having a high affinity with the monomer (B) at a good condition.

The monomer (C) having a polymerizable carbon-carbon double bond other than the above-described monomers (A) and (B) may be an additional polymerizable compound having a carbon-carbon double bond except methacrylic ester monomer or acrylic ester monomer. As such a monomer (C), an olefin such as ethylene and propylene, a vinyl halide such as vinyl chloride and vinyl fluoride, a vinyl ester such as vinyl formate and vinyl acetate, an aromatic vinyl compound such as vinyl ketone, maleimide, styrene and methylstyrene, and an additional polymerizable compound having a carbon-carbon double bond such as acrylonitrile, methacrylonitrile, vinyl pyrolidone, vinyl alcohol and acrylic amide can be employed. Among these compounds, a vinyl ester such as vinyl formate and vinyl acetate, vinyl ketone, maleimide, styrene, acrylonitrile and methacrylonitrile are preferred because they are easily polymerized and can prevent gelation effectively.

The monomer (C) is used for the purpose of suppressing the gelation caused when the monomer (A) and the monomer (B) are copolymerized and synthesizing a copolymer having a high water content which is insoluble to water and soluble to other solvents. Further, by containing the monomer (C), gelation is suppressed and it is possible to achieve a high antifouling property. In a case of containing the monomer (A) at the same content, the water content increases and the advantage in antifouling property which is a characteristic according to the present invention increases, depending on the content of the monomer (C). Where, the "water content" means a moisture percentage by weight in a moisture-saturated polymer at a temperature of 30° C. In order to obtain the advantage, the monomer (C) must be present in the copolymer at a mean content more than 5% by weight. Preferably the monomer (C) is present in the copolymer at a content of not less than 10% by weight to obtain a high antifouling property. If the content of the monomer (C) is too high, the antifouling property and the affinity with other materials decrease because the advantages due to the monomer (A) and the monomer (B) are lost. Therefore, the mean content of the monomer (C) must be less than 90% by weight, preferably not more than 50% by weight.

Further, a monomer except the monomers (A), (B) and (C) can be used as a copolymerized component depending upon the purpose of the use. For example, in a case the content of the monomer (A) is high and the molecular weight of the copolymer is low, the copolymer tends to dissolve in water. In such a case, as needed, a crosslinked monomer may be added to obtain a loose crosslinked polymer. Although such a crosslinked monomer is not particularly restricted, a monomer having at least two polymerizable carbon-carbon double bond in its molecule, for example, ethylene glycol dimethacrylate, diethylene glycol dimethacrylate, polyethylene glycol dimethacrylate, divinylbenzene or methylene bisacrylic amide can be preferably used. The amount of the crosslinked monomer is decided depending on the kind, crosslinkage condition and purpose of use of the monomer component. Although the amount cannot be particularly specified, it is preferably not more than 10% by weight not to affect the characteristics aimed by the present invention.

The method for synthesizing the copolymer according to the present invention is not particularly restricted, and a method for copolymerizing it in a solvent using a usual radical initiator, for example, azobisisobutyronitrile, azobis-dimethylvaleronitrile or benzoilperoxide is simple and preferably used.

The molecular weight of the copolymer may be appropriately controlled depending on the purpose of the use, and it is not particularly limited. In a case where the copolymerization is performed using a radical initiator, the molecular weight can be freely controlled by changing the temperature, the concentration of the initiator and the concentration of the monomer in a solution.

The reaction products can be determined by extracting a produced polymer from a reaction solution during the reaction and using a usual method, for example, elemental analysis, infrared absorption spectrum or nuclear magnetic resonance spectrum (NMR). The composition of the copolymer can be determined by quantitating unreacted monomers of the reaction solution by gas chromatography and high-speed liquid chromatography. The molecular weight of the copolymer can be easily determined by, for example, gel osmosis chromatography or viscometric determination, because the copolymer is soluble to a solvent.

The polymer can be appropriately formed depending upon desired quality and shape by molding by cast polymerization, melt molding or solvent casting or dipping as well as a method for blending it with various synthetic resins, for example, soft polyvinyl chloride, polyurethane or polydimethylsiloxane or coating it onto them.

As the solvent used as a solution, all the solvents capable of dissolving the copolymer can be used. For example, dimethylformamide, dimethylsulfoxide, dimethylacetamide, N-methylpyrolidone and tetrahydrofuran are preferably employed. Further, an alternate mixture of these solvents also can be used.

The copolymer dissolved using these solvents can be used by coating or forming it in a form of a film or membrane. Such a formation can be performed using a known method. For example, in a case of a plane membrane, the solution for the membrane formation is extended on a glass plate in an atmosphere controlled with its temperature and humidity, and after the solution is formed as a membrane with a desired thickness by, for example, an applicator sold on the market, it is dipped in a coagulation bath, and an aimed membrane is obtained by coagulation and solvent elimination. Because the solution for membrane formation, the coagulation bath and a posttreatment affect the property for the membrane formation also in this case, appropriate conditions are preferably selected.

The "antifouling property", which is a characteristic of the hydrophilic material according to the present invention, means a property which suppresses adhesion of a solute component to a surface of a membrane when various protein solutions are concentrated, when a liquid food is sterilized or when separation by ultrafiltration is performed in a waste water treatment process. Further, in a case when used for medical care, for example, suppression of adhesion of material components such as platelets, leucocytes, erythrocytes and fibroblasts caused by contact with blood or body fluid is included in the antifouling property. On the other hand, the property which suppresses formation of a thrombus occurring when a material directly comes into contact with blood is called "antithrombotic property". Formation of a thrombus is frequently used as an index for estimation of the antithrombotic property. Further, the formation of a thrombus becomes a point for determination of typical characteristics in estimation of vital suitability of a material coming into contact with blood. On the other hand, as a method for determining only the antithrombotic property, a method for observing the amount and the alteration of platelets, leucocytes and erythrocytes present on the surface of the material after contact with blood by a scanning type electron microscope (SEM) as well as determining the time of external circulation and the amount of blood flow is well known.

These materials unadhesive with vital components can be effectively used particularly for medical materials. For example, they indicate excellent properties as protectors for wounds, membranes for an artificial kidney or artificial lung, substrates for fixing or releasing a medicine, contact lenses, internal scopes for a blood vessel or various catheters requiring suitability to blood, cannulas, needles for storage of blood vessels, blood preserving containers, blood pumping chambers and supports for affinity absorption.

The semipermeable membrane according to the present invention will be hereunder explained in detail.

The semipermeable membrane according to the present invention can be obtained by blending the aforementioned copolymer and a methacrylic ester polymer or an acrylic ester polymer and making a membrane therefrom. As the methacrylic ester or acrylic ester polymer which can be used in this case, for example, a polymer composed of an acrylic ester such as acrylic acid, methyl acrylate, ethyl acrylate, propyl acrylate, butyl acrylate, lauryl acrylate, 2-ethylhexyl acrylate, cyclohexyl acrylate or benzizyl acrylate, or a polymer composed of a methacrylic ester such as methacrylic acid, methyl methacrylate, ethyl methacrylate, propyl methacrylate, butyl methacrylate, lauryl methacrylate, 2-ethylhexyl methacrylate, cyclohexyl methacrylate or benzizyl methacrylate can be exemplified. Further, the polymer may be a mixture of these polymers or a copolymer of these polymers. Further, although it may be a copolymer containing a small amount of a copolymerizable component other than methacrylic ester and acrylic ester, the content of methacrylic ester or acrylic ester is preferably not less than 70% by weight to ensure a permeability required for the semipermeable membrane. As the copolymerizable component other than methacrylic ester and acrylic ester, for example, a monomer or polymer having an anion group such as parastyrene sulfonic soda can be employed. In this case, by copolymerizing the monomer or polymer having an anion group with methacrylic ester and acrylic ester, it is expected to increase the permeability of low-molecular weight substances and to prevent large-molecular weight substances from permeation by making the pores finer. The methacrylic ester or acrylic ester polymer is used by blending with the aforementioned copolymer having an antifouling property mainly for reinforcing the strength of the membrane. Further, in order to increase the strength of the membrane, with respect to this polymer, a method for using a polymer having an isotactic structure and a polymer having a syndiotactic structure together and forming a stereocomplex can be preferably employed. The structure of the polymer can be recognized by NMR.

In a case of formation after blending different polymers, they are frequently incompatible with each other and they frequently phase split from each other even if they are used under a condition dissolved in a solvent, and a uniform formed body cannot be formed in such a condition. In the present invention, however, stable formed body and mixture solution can be formed in a compatible or semi-compatible condition by selectively using a methacrylic ester or acrylic ester polymer. For this, the methacrylic ester or acrylic ester polymer preferably has a high affinity with the copolymer having an antifouling property, and in particular, the polymer composed of only the component (B) in the copolymer has an excellent affinity with the component (B) in the copolymer and it is preferred.

Further, use of components other than the copolymer and the methacrylic ester or acrylic ester polymer can be allowed in a range which does not injure the good antifouling property aimed in the present invention. As such a component, for example, it is considered that a polymer used as a pore forming agent in a membrane formation process remains in a semipermeable membrane even after formation of the membrane.

As a method for obtaining the semipermeable membrane, for example, a method for forming a fine membrane after melt spinning or a method for forming a membrane after dissolving the polymer in a solvent or blending it with a pore forming agent, and thereafter removing the solvent or the pore forming agent, can be employed.

As the solvent for forming a solution in a form of a membrane, all solvents capable of dissolving a polymer composition can be used, and for example, dimethylformamide, dimethylsulfoxide, dimethylacetamide and N-methylpyrolidone are preferably used. Further, an alternate mixture of these solvents also can be used.

Such a formation can be performed using a known method. For example, in a case of a plane membrane, the solution for the membrane formation is extended on a glass plate in an atmosphere controlled with its temperature and humidity, and after the solution is formed as a membrane with a desired thickness by, for example, an applicator sold on the market, it is dipped in a coagulation bath, and an aimed membrane is obtained by coagulation and solvent elimination. Because the solution for membrane formation, the coagulation bath and a posttreatment affect the property for the membrane formation in this case, appropriate conditions are preferably selected.

The hollow fibers frequently used for an artificial kidney or artificial lung will be explained in more detail. In a case where the raw-material solution for spinning is delivered out from a die, maintaining a formation of a hollow fiber must be sufficiently considered as well as forming a smooth fiber. The viscosity of the raw-material solution is an important factor to deliver the fiber stably, and for satisfying this condition, it is possible to control the viscosity of the raw-material solution by controlling the temperature of a die. In a case where stretching is not performed in the process, usually the dimension of the hollow fiber is almost decided in a coagulation bath. In a case where a hollow die having a hole size larger as compared with an aimed size is used, it is effective to deliver the raw-material solution for spinning into an atmosphere and thereafter coagulate the solution by dipping it in a coagulation bath, that is, so-called dry and wet spinning method.

To maintain the formation of the hollow fiber, a liquid is injected into the interior of the hollow fiber. As the injected liquid, for example, a solvent for the raw-material solution for spinning, a coagulant such as water and (polyfunctional) alcohols or a mixture thereof, or the copolymer or a hydrophobic liquid which is a nonsolvent of a mixture therewith, for example, an aliphatic hydrocarbon such as n-octane or liquid paraffin or a fatty acid ester such as myristic isopropyl can be used. In a case where a hydrophilic coagulant is used, a hydrophilic polymer component having a high affinity with the coagulant moves to the inner surface of the membrane, and it coagulates.

Further, in a case where the delivered yarn is gelled by alteration of temperature thereof in an atmosphere or a solid structure is rapidly formed by coagulation, an inert gas such as nitrogen gas or air introduced by self-suction or provided by press-injection can be used. Such a gas injection method is a very advantageous method for the process. In a case of a raw-material solution gelled by alteration of temperature, the gelation can be accelerated by blowing a cold air in a dry portion of the process.

In this case, the length of the hollow portion, that is, a dry portion, becomes not less than 30 mm. Further, in a case where the raw-material solution is not gelled by alteration of temperature or is not associated with a rapid increase in viscosity and the formation of the hollow fiber is maintained only by coagulation, it is preferred that the length of the dry portion is adjusted shorter. If the length of the dry portion is too long, the hollow ratio (ratio of inner diameter to outer diameter) of the fiber becomes small, and a local expansion occurs before reaching a aimed hollow ratio when the pressure of the injection is elevated. If it is too short, a rapid draft is applied and the spinning becomes unstable. Therefore, usually the length of the dry portion is set in a range of not less than 1 mm and not more than 100 mm, preferably in a range of not less than 3 mm and not more than 50 mm.

In such a gas injection method, although the movement of a polymer component to the inner surface does not occur as in a liquid injection method, an uneven structure can be formed within several tens nm from the surface by the polymer blending technology according to the present invention. The surface components can be determined by X-ray photoelectron spectrum (XPS) or secondary ion mass spectrum (SIMS).

The coagulation bath usually comprises a coagulant such as water or a (polyfunctional) alcohol, or a mixture with a solvent constituting the raw-material solution for spinning. The composition of the coagulation bath usually greatly affects the spinning stability and the membrane structure of the hollow fiber depending upon the coagulation property. If the coagulation property is higher than that of the raw-material solution for spinning, very large voids are generated on the membrane portion of the hollow fiber. If the coagulation property is low, it becomes difficult to maintain the formation of the hollow fiber. Therefore, the composition must be appropriately controlled as well as the characteristics of the raw-material solution. The temperature of the coagulation bath greatly affects the coagulation property and is an important factor for the permeability of the membrane. Namely, as the temperature of the bath becomes high, the permeability becomes high. Accordingly, the temperature is combined at an appropriate condition with the above-described composition of the coagulation bath relative to an aimed permeability.

After the coagulation, a sufficient washing by water is performed. In order to prevent the membrane structure from being broken by drying the hollow fiber containing water, the water present in the membrane structure is substituted for glyceline, ethylene glycol, etc. Further, as needed, a dimensional stability can be provided by performing a heat treatment using a glyceline solution.

Such an antifouling semipermeable membrane can be effectively used particularly for medical materials directly coming into contact with blood, a body fluid or a vital tissue, and it indicates excellent properties, for example, in use for an artificial kidney, artificial lung or artificial liver.

The present invention will be hereunder explained in more detail by examples. However, the present invention is not limited by the examples.

EXAMPLES

Example 1, Comparative Example 1

After methoxypolyethylene glycol methacrylate "M900G" (mean degree of polymerization of ethylene oxide portion: 90, weight average molecular weight: 4060, produced by Shinnakamura Kagaku Kogyo Kabushiki Kaisya, hereinafter referred to as "M900G") of 20 parts by weight, methyl methacrylate (hereinafter referred to as "MMA") of 20 parts by weight, styrene (hereinafter referred to as "St") of 10 parts by weight and methanol of 50 parts by weight were dissolved, 2,2'-azobis-2,4-dimethylvaleronitrile (hereinafter referred to as "ADVN") of 0.1 part by weight was added, and the mixture was radically polymerized in a closed container enclosing a nitrogen gas at a condition of 55° C. and 24 hours. After the polymerization, 4 liters of water was extracted as well as the remaining monomers were extracted in methanol, and after this was repeated six times, drying under a vacuum condition of 30° C. and 48 hours was performed to prepare a copolymer containing a hydrophilic component.

At that time, the amounts of unreacted MMA, St and M900G during the polymerization were determined by high-speed chromatography with the passage of time, and it was recognized that the amounts of the unreacted monomers of the three components were all decreasing from the time of a low polymerization ratio and they were copolymerized.

The yield of the polymer obtained was 97% by weight, and the polymerization was recognized to be almost completed therefrom. Where, the copolymerization of M900G, MMA and St was confirmed by the facts that the polymer of only M900G was soluble to water and that the yield was high.

The copolymer obtained could be dissolved in tetrahydrofuran, dimethylsulfoxide (hereinafter referred to as "DMSO"), etc. This solution was transparent even when it was observed by a phase contrast microscope at a magnification of 400 times. It is understood that a copolymer was synthesized in this Example, from the fact that sea-island phase separation due to incompatibility between respective polymers can be recognized in a polymer mixture of PMMA, PSt and M900G having the same composition.

The composition of this copolymer containing a hydrophilic component could be determined by the analysis of NMR. The NMR data is shown in FIG. 1. The composition ratio of the copolymer calculated from this result is nearly equal to the charge weight composition. By this, it was confirmed that, because the polymer obtained by this polymerization process was polymerized to a high degree of polymerization in a closed container, the composition ratio of the polymer obtained was equal to a composition ratio of the monomer. Further, it was also confirmed by enlarged analysis of the carboxylic group portion of the PMMA that MMA and St units were randomly copolymerized. Furthermore, the water content of the polymer was 50% by weight.

By these analyses, it was confirmed that a copolymer containing a hydrophilic component could be synthesized.

Further, the antithrombotic property of this composition was determined by the following method.

A solution prepared by dissolving the obtained copolymer of 15 parts by weight in dimethylsulfoxide of 85 parts by weight at a temperature of 105° C. was dropped onto a glass plate on which spacers having a thickness of 100μm (two tapes, produced by Scotch Corporation) were stuck and which was controlled at a temperature of 105° C., and stretched in a form of a plain membrane by a stainless rod. A porous membrane was formed by dipping the glass plate in water controlled at a temperature of 30° C. before the solvent evaporated. The porous membrane formed was sufficiently washed with water.

Figure 2:
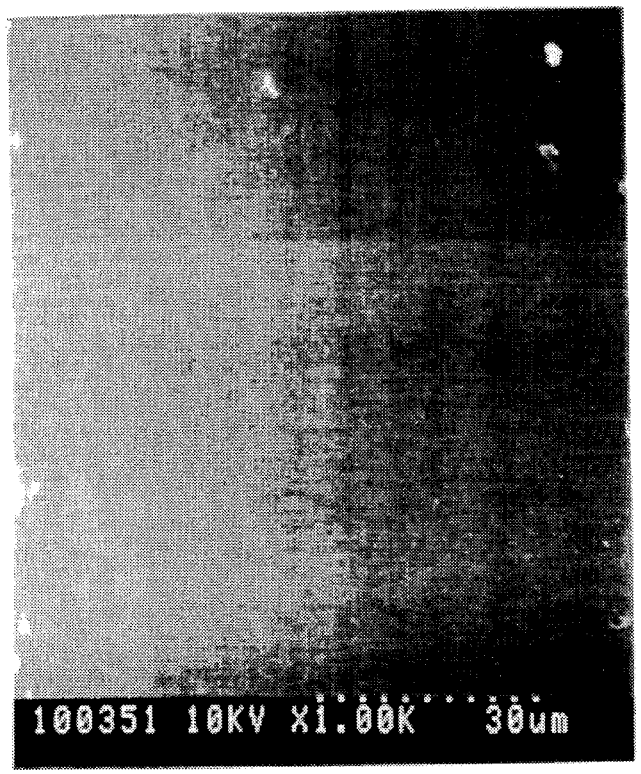
FIG. 2 is a microphotograph of a surface of a membrane obtained in Example 1.
Figure 3:
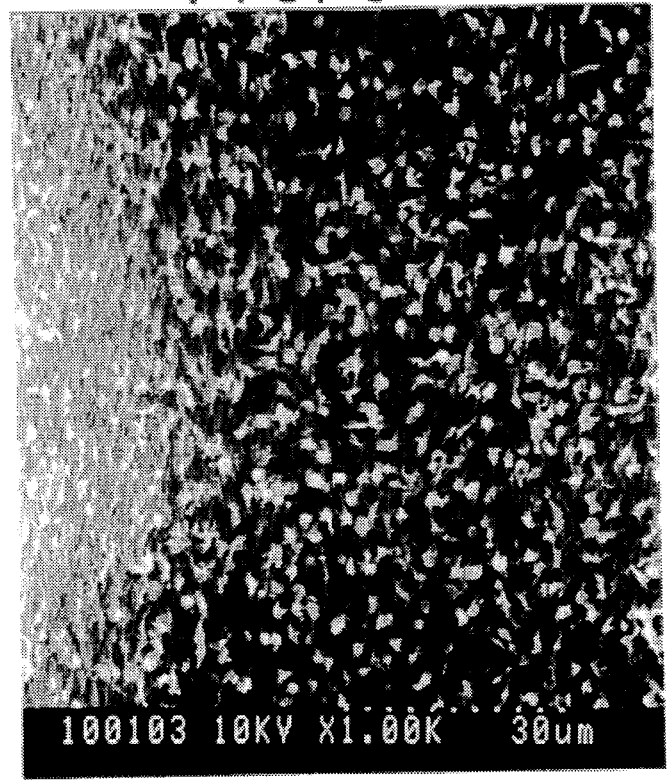
FIG. 3 is a microphotograph of a surface of a membrane obtained in Comparative Example 1.

The porous membrane was dipped in a platelet rich plasma (hereinafter referred to as "PRP") at a temperature of 37° C. for 3 hours, and thereafter, the platelets adhered to the surface of the membrane were observed by a scanning type electron microscope. The PRP was prepared by drawing blood from the carotid artery of a rabbit using a syringe enclosing a 3.8% sodium citrate solution at 1/10 content relative to the total amount of blood to be drawn, and thereafter, immediately transferring the drawn blood into a test tube treated with silicone, and decanting the blood at a condition of 800 to 1,000 revolution/min. for 8 to 15 minutes. The number of the platelets was controlled to not less than 200,000/ μl. A glass plate indicating the most stable adhesion property of platelets was used as a material for comparison and controlling. The adhesion state of the platelets in the present invention was relatively determined using the estimation standards shown in Table 1. In the SEM photographs, although a material, wherein the adhesion and deformation of platelets are clearly little as compared with those in the PMMA and the glass plate, is determined to be an excellent material, Levels 3 and 4 of antithrombotic property in the Table 1 are preferred in order to put the material to practical use as an antithrombotic membrane, coating material or molding material. The result of Example 1 was shown in FIG. 2, and the result of Comparative Example 1 was shown in FIG. 3. As the results, it was understood that the adhesion of platelets to the membrane using the polymer according to the present invention was remarkably decreased.

TABLE 1

| Level of thrombotic property | 4 | 3 | 2 | 1 |
| --- | --- | --- | --- | --- |
| Adhesion and deformation state of platelets | There is no adhesion of platelets. | There is a small amount of adhesion of platelets | There is a large amount of adhesion of platelets. Deformation is small. | There is a large amount of adhesion of platelets and the platelets are deformed. |

Example 2

After M900G of 20 parts by weight, MMA of 20 parts by weight, vinyl acetate of 10 parts by weight and methanol of 50 parts by weight were dissolved, azobisdimethylvaleronitrile (hereinafter referred to as "ADVN") of 0.1 part by weight was added. Polymerization and refining were performed in the same conditions as those of Example 1 to prepare a copolymer containing a hydrophilic component.

The composition obtained was confirmed to be a copolymer having a composition equal to that of the charge weight composition in a manner similar to that of Example 1.

The level of antithrombotic property of the membrane formed in a manner similar to that of Example 1 was 3. Further, the water content of the polymer was 60% by weight.

Example 3

After M900G of 20 parts by weight, MMA of 20 parts by weight and vinyl acetate of 10 parts by weight were dissolved, azobisdimethylvaleronitrile (hereinafter referred to as "ADVN") of 0.1 part by weight was added. Polymerization was started at the same condition as that of Example 1, and at the time when the total degree of polymerization reached 40% by weight, refining was performed by precipitating the polymer solution in water to prepare a copolymer containing a hydrophilic component.

Figure 4:
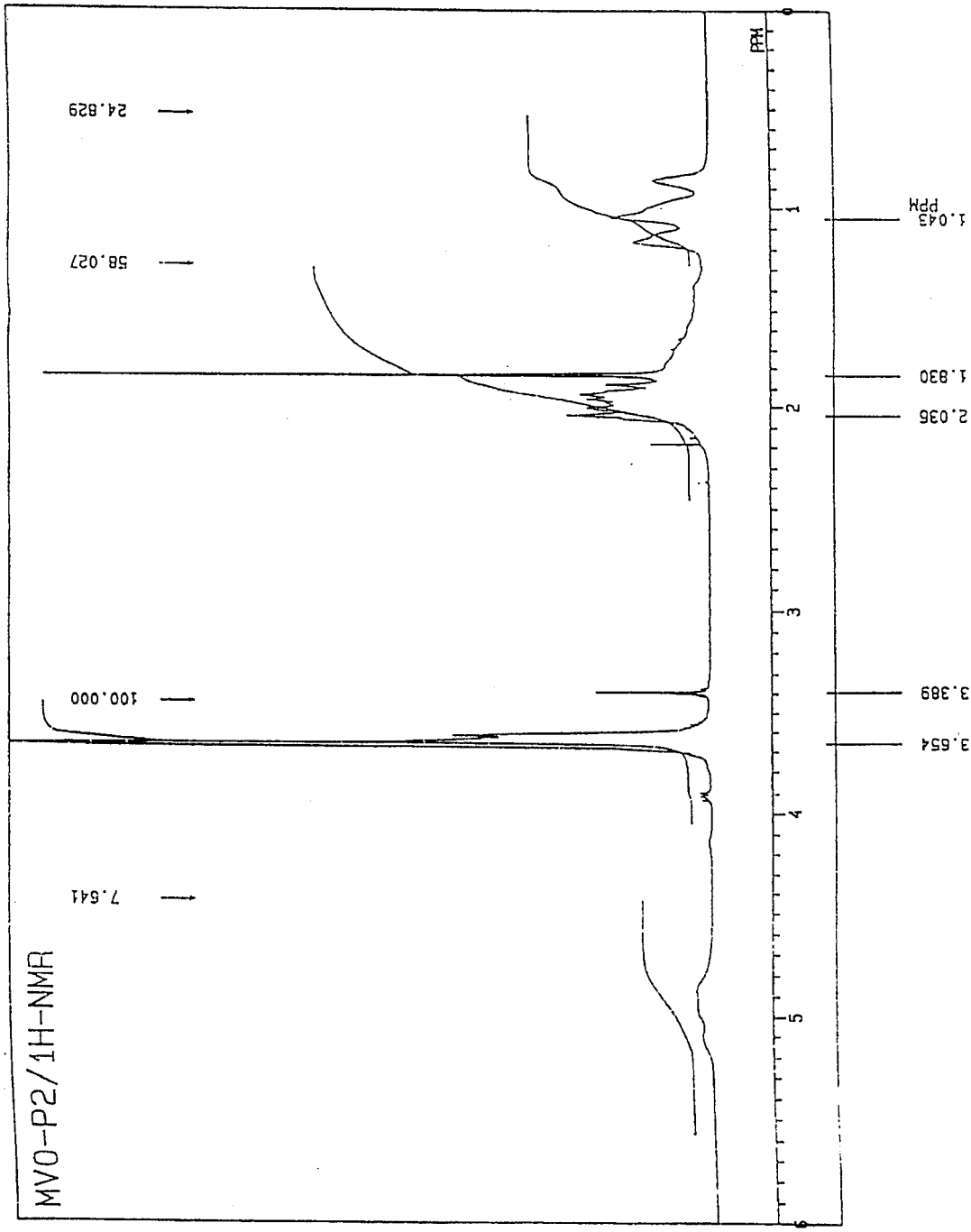
FIG. 4 is a NMR chart with respect to a copolymer of Example 3.

The composition of the material obtained was determined by NMR (the chart is shown in FIG. 4), and the composition was confirmed to be of M900G of 38% by weight, MMA of 36% by weight and vinyl acetate of 28% by weight. The water content was 71% by weight.

The level of antithrombotic property of the membrane formed in a manner similar to that of Example 1 was 3. Further, the water content of the polymer was 60% by weight.

A solution prepared by dissolving the obtained copolymer of 1.5 part by weight and polymethylmethacrylate (hereinafter referred to as "PMMA") of 13.5 parts by weight in dimethylsulfoxide of 85 parts by weight at a temperature of 105° C. was formed as a membrane in a manner similar to that of Example 1. Although two kinds of polymers were blended and formed as a membrane in this Example, because PMMA component was contained at an appropriate content in both polymers, the membrane formation property was good.

The level of antithrombotic property of the membrane using the polymer according to the present invention was 4.

Comparative Example 2

After M900G of 20 parts by weight, MMA of 30 parts by weight and methanol of 50 parts by weight were dissolved, ADVN of 0.1 part by weight was added. Polymerization and refining were performed in the same conditions as those of Example 1 to prepare a copolymer containing a hydrophilic component. The water content of the polymer was 43% by weight, and it was low as compared with those of Examples according to the present invention in which the same amount of M900G was contained.

Because the polymer of this Comparative Example did not contain the monomer (C) according to the present invention, it did not completely dissolve in a solvent. After undissolved components were removed from the solution, it was formed as a membrane. As a result, the amount of adhesion of platelets was equivalent to that of the case in Comparative Example 1 using a glass plate.

Examples 4–12, Comparative Example 3

After M900G, MMA and acrylonitrile (hereinafter referred to as "AN") of respective parts by weight shown in Table 2 and methanol of 50 parts by weight were dissolved, ADVN of 0.1 part by weight was added. Polymerization and refining were performed in the same conditions as those of Example 1 to prepare a copolymer containing a hydrophilic component.

After these compositions obtained were confirmed to be copolymers having compositions equal to those of the respective charge weight compositions in a manner similar to that of Example 1, the water contents thereof were determined. If the amount of M900G was same, it was understood that the water content increased as the content of AN became higher.

Membrane formation was performed in a manner similar to that of Example 3, and the antithrombotic properties of the membranes formed were determined. Although the size of pores became large and the membrane formation property tended to deteriorate when the amount of AN increased, the membrane formation property could be maintained to be one sufficiently subjected to practical use. In any of Examples 4 to 12, an excellent antithrombotic property was achieved.

Although the polymer obtained in Comparative Example 3 was low in content of monomer (C) and tended to be gelled, it could be dissolved in a solvent almost completely. Although the amount of adhesion of platelets to the membrane slightly decreased as compared with that of Comparative Example 2, the amount of adhesion of platelets was large as compared with those of Examples and it was not in a level which could be subjected to practical use.

TABLE 2

| Example | M900G | MMA | AN | Water content (wt. %) | Antithrombotic property level |
|---|---|---|---|---|---|
| Example 4 | 20 | 20 | 10 | 70 | 4 |
| Example 5 | 10 | 20 | 20 | 38 | 3 |
| Example 6 | 20 | 5 | 25 | 77 | 4 |
| Example 7 | 20 | 25 | 5 | 50 | 3 |
| Example 8 | 15 | 30 | 5 | 39 | 3 |
| Example 9 | 20 | 15 | 15 | 68 | 4 |
| Example 10 | 25 | 20 | 5 | 71 | 3 |
| Example 11 | 15 | 5 | 30 | 65 | 4 |
| Example 12 | 25 | 5 | 20 | 85 | 4 |
| Com. Ex. 3 | 20 | 28 | 2 | 45 | 1–2 |

Comparative Example 4

After M900G of 12 parts by weight, PAN of 18 parts by weight and methanol of 70 parts by weight were dissolved, ADVN of 0.1 part by weight was added. Polymerization and refining were performed in the same conditions as those of Example 1 to prepare a copolymer containing a hydrophilic component.

The composition obtained was confirmed to be a copolymer having a composition equal to that of the charge weight composition in a manner similar to that of Example 1. The water contents thereof was 65% by weight. Although membrane formation was performed in a manner similar to that of Example 3, because the copolymer and the PMMA were phase separated from each other, the membrane formation property was remarkably bad and the membrane obtained was fragile.

Example 13

After M900G of 20 parts by weight, MMA of 20 parts by weight, ethylvinylketone of 10 parts by weight and methanol of 50 parts by weight were dissolved, ADVN of 0.1 part by weight was added. Polymerization and refining were performed in the same conditions as those of Example 1 to prepare a copolymer containing a hydrophilic component.

The composition obtained was confirmed to be a copolymer having a composition equal to that of the charge weight composition in a manner similar to that of Example 1. The water contents thereof was 66% by weight.

The amount of adhesion of platelets in the membrane using the polymer according to the present invention remarkably decreased.

Example 14, Comparative Example 5

The copolymer of 100 parts by weight obtained in Example 1, syndiotactic PMMA of 67 parts by weight which was prepared by polymerizing 100% MMA in DMSO and whose weight average molecular weight converted into that of polystyrene by GPC method was 600,000, isotactic PMMA of 33 parts by weight and dimethylsulfoxide of 570 parts by weight were blended, and a raw-material solution for spinning was prepared by stirring the mixture at 110° C. for 8 hours.

The obtained raw-material solution for spinning was delivered into the atmosphere at a rate of 1.2 g/min. from a ring slit type hollow die controlled at a temperature of 99° C. and having outer diameter/inner diameter of 1.0/0.7 mm φ. At the same time, a nitrogen gas was injected into the interior of the hollow structure at a pressure of 47 mmAq. The length of the dry portion was 60 mm, and water controlled at 30° C. was used for a coagulation bath. After water washing, it was heat treated for relaxation of 5% with a 73% glyceline solution controlled at 75° C., and sampled at a speed of 30 m/min. The amount of polyethylene oxide unit contained in the polymer of the hollow fiber obtained was 15% by weight. The inner diameter/membrane thickness of the hollow fiber membrane was 230/28 μm, the water permeability thereof was 54 ml/hr·mmHg·m$^2$, the permeability of 5% albumin solution was 8.2 ml/hr·mmHg·m$^2$, and the blocking ratio was 99%.

Figure 5:
FIG. 5 is a microphotograph of a surface of a membrane obtained in Example 14.
Figure 6:
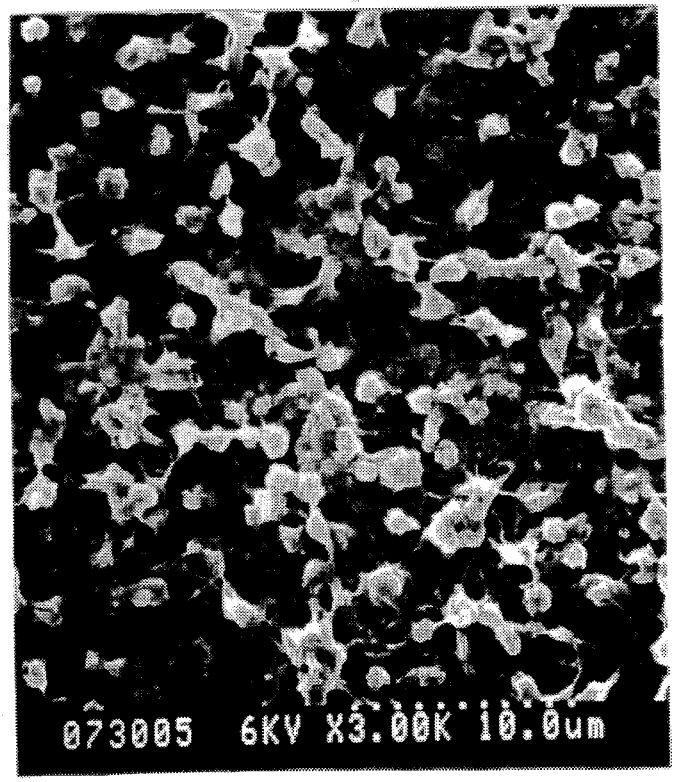
FIG. 6 is a microphotograph of a surface of a membrane obtained in Comparative Example 5.

The hollow fiber membrane was cut at a length of 10 cm, 30 cut fibers were gathered and introduced into a glass tube, and both end portions thereof were fixed by a resin to prepare a module. A pure blood of a rabbit was circulated in the hollow fibers of the module at 37° C. for 3 hours, and thereafter, the amount of the platelets adhered to the inner surface of the membrane was observed by a scanning type electron microscope. The result was shown in FIG. 5. In Comparative Example 5, a PMMA hollow fiber membrane produced by Toray Industries, Inc. was used. The amount of adhesion of platelets in the membrane using the polymer according to the present invention remarkably decreased as compared with that in the PMMA hollow fiber membrane (FIG. 6) which was used as a standard material.

Example 15

After M900G of 20 parts by weight, MMA of 15 parts by weight, acrylonitrile (hereinafter referred to as "AN") of 15 parts by weight and methanol of 50 parts by weight were dissolved, ADVN of 0.1 part by weight was added. Polymerization and refining were performed in the same conditions as those of Example 1 to prepare a copolymer containing a hydrophilic component.

The composition obtained was confirmed to be a copolymer having a composition equal to that of the charge weight composition in a manner similar to that of Example 1.

The copolymer containing a hydrophilic component of 100 parts by weight, syndiotactic PMMA of 67 parts by weight which was prepared by polymerizing 100% MMA in DMSO and whose weight average molecular weight converted into that of polystyrene by GPC method was 600,000, isotactic PMMA of 33 parts by weight and dimethylsulfoxide of 570 parts by weight were blended, and a raw-material solution for spinning was prepared by stirring the mixture at 110° C. for 8 hours.

The obtained raw-material solution for spinning was delivered into the atmosphere at a rate of 1.2 g/min. from a ring slit type hollow die controlled at a temperature of 99° C. and having outer diameter/inner diameter of 1.0/0.7 mm φ. At the same time, a nitrogen gas was injected into the interior of the hollow structure at a pressure of 47 mmAq. The length of the dry portion was 60 mm, and water controlled at 30° C. was used for a coagulation bath. After water washing, it was heat treated for relaxation of 5% with a 73% glyceline solution controlled at 75° C., and sampled at a speed of 30 m/min. The amount of PEO (polyethylene oxide) unit contained in the polymer of the hollow fiber obtained was 15% by weight. The inner diameter/membrane thickness of the hollow fiber membrane was 230/28μm, the water permeability thereof was 54 ml/hr·mmHg·m$^2$, the permeability of 5% albumin solution was 8.2 ml/hr·mmHg·m$^2$, and the blocking ratio was 99%.

Figure 7:
FIG. 7 is a microphotograph of a surface of a membrane obtained in Example 15.

The hollow fiber membrane was formed as a module in a manner similar to that of Example 14. A pure blood was circulated in the hollow fiber membranes of the module at 37° C. for 3 hours, and thereafter, the amount of the platelets adhered to the inner surface of the membrane was observed by a scanning type electron microscope. The result was shown in FIG. 7. The amount of adhesion of platelets in the membrane using the polymer according to the present invention remarkably decreased as compared with that in the PMMA hollow fiber membrane which was used for comparison.

Example 16

The copolymer containing a hydrophilic component obtained in Example 3 of 21 parts by weight, syndiotactic PMMA of 27 parts by weight, PMMA copolymerized with parastyrene sulfonic soda of 1.5 mol% of 26 parts by weight, isotactic PMMA of 36 parts by weight and dimethylsulfoxide of 790 parts by weight were blended, and a raw-material solution for spinning was prepared by stirring the mixture at 110° C. for 12 hours.

The obtained raw-material solution for spinning was delivered into the atmosphere at a rate of 2.07 g/min. from a ring slit type hollow die controlled at a temperature of 95° C. and having outer diameter/inner diameter of 2.0/1.8 mm φ. At the same time, a nitrogen gas was injected into the interior of the hollow structure at a pressure of 34 mmAq. The length of the dry portion was 190 mm, and water controlled at 50° C. was used for a coagulation bath. After water washing, it was heat treated with a 77% glyceline solution controlled at 81° C., and sampled at a speed of 49 m/min. The inner diameter/membrane thickness of the obtained hollow fiber membrane was 210/32 μm, and the water permeability thereof was 73 ml/hr/mmHg/m$^2$.

Using the hollow fiber membranes, a minimodule having a number of yarns of 2,300, an effective length of 13.5 cm and an effective membrane area of 0.2 m$^2$ was formed, and the diffuse permeability of low molecular weight substances was determined. As a result, the diffuse permeability of urea was $1.8 \times 10^{-3}$ cm/sec., and the diffuse permeability of vitamin B12 was $3.8 \times 10^{-4}$ cm/sec.

Further, the hollow fiber membrane was treated in a manner similar to that of Example 14, and the state of adhesion of platelets was observed. The amount of adhesion of platelets in the membrane using the polymer according to the present invention remarkably decreased as compared with that in the PMMA hollow fiber membrane which was used as a standard material similarly in Example 14.

Example 17

The copolymer containing a hydrophilic component obtained in Example 3 of 21 parts by weight, syndiotactic PMMA of 153 parts by weight, isotactic PMMA of 36 parts by weight and dimethylsulfoxide of 790 parts by weight were blended, and a raw-material solution for spinning was prepared by stirring the mixture at 110° C. for 12 hours.

The obtained raw-material solution for spinning was delivered into the atmosphere at a rate of 1.46 g/min. from a ring slit type hollow die controlled at a temperature of 100° C. and having outer diameter/inner diameter of 2.0/1.8 mm φ. At the same time, a nitrogen gas was injected into the interior of the hollow structure at a pressure of 22 mmAq. The length of the dry portion was 190 mm, and water controlled at 10° C. was used for a coagulation bath. After water washing, it was heat treated with a 81% glyceline solution controlled at 83° C., and sampled at a speed of 30 m/min. The inner diameter/membrane thickness of the obtained hollow fiber membrane was 210/30 μm, and the water permeability thereof was 56 ml/hr/mmHg/m$^2$.

Using the hollow fiber membranes, a minimodule having a number of yarns of 2,300, an effective length of 13.5 cm and an effective membrane area of 0.2 m$^2$ was formed, and the diffuse permeability of low molecular weight substances was determined. As a result, the diffuse permeability of urea was $7.9 \times 10^{-4}$ cm/sec., and the diffuse permeability of vitamin B12 was $1.6 \times 10^{-4}$ cm/sec.

Further, the hollow fiber membrane was treated in a manner similar to that of Example 14, and the state of adhesion of platelets was observed. The amount of adhesion of platelets in the membrane using the polymer according to the present invention remarkably decreased as compared with that in the PMMA hollow fiber membrane which was used as a standard material similarly in Example 14.

INDUSTRIAL APPLICATIONS OF THE INVENTION

In the present invention, a copolymer composition is provided, which can be dissolved in a solvent, can be easily formed and is excellent in an antifouling property such as antithrombotic property.

We claim:

1. A hydrophilic material characterized in that said material comprises a copolymer composed of a monomer (A) having a polyalkylene oxide unit and a polymerizable carbon-carbon double bond in its molecule, a methacrylic ester monomer or an acrylic ester monomer (B) and a monomer (C) having a polymerizable carbon-carbon double bond other than said monomer (A) and monomer (B), and the content of said monomer (C) is not less than 5% by weight and not more than 90% by weight.

2. The hydrophilic material according to claim 1, wherein the content of said monomer (C) is not less than 10% by weight and not more than 50% by weight.

3. The hydrophilic material according to claim 1, wherein said monomer (A) is a monomer represented by the following chemical formula (1):

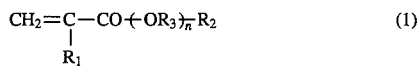

(Where, "n" represents an integer of not less than 5, "$R_1$" represents H or $CH_3$, "$R_2$" is selected from the group consisting of a hydroxyl group, an alkoxy group of $C_1$ to $C_4$ and $OCH\phi_2$ ("φ" represents a phenyl group), and "$R_3$" represents an alkylene).

4. The hydrophilic material according to claim 1, wherein said monomer (A) is a vinyl monomer represented by the following chemical formula (2):

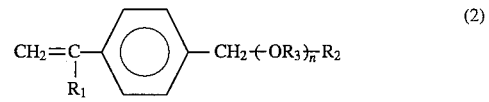

(Where, "n" represents an integer of not less than 5, "$R_1$" represents H or $CH_3$, "$R_2$" is selected from the group consisting of a hydroxyl group, an alkoxy group of $C_1$ to $C_4$ and $OCH\phi_2$ ("φ" represents a phenyl group), and "$R_3$" represents an alkylene).

5. The hydrophilic material according to claim 1, wherein said monomer (B) is selected from the group consisting of acrylic acid, methyl acrylate, ethyl acrylate, propyl acrylate, butyl acrylate, lauryl acrylate, 2-ethylhexyl acrylate, cyclohexyl acrylate, benzizyl acrylate, methacrylic acid, methyl methacrylate, ethyl methacrylate, propyl methacrylate, butyl methacrylate, lauryl methacrylate, 2-ethylhexyl methacrylate, cyclohexyl methacrylate and benzizyl methacrylate.

6. The hydrophilic material according to claim 1, wherein said monomer (C) is selected from the group consisting of an olefin, a vinyl halide, a vinyl ester, an aromatic vinyl compound, acrylonitrile, methacrylonitrile, vinyl pyrolidone, vinyl alcohol and acrylic amide.

7. An antithrombotic material comprising the hydrophilic material according to claim 1.

8. The antithrombotic material according to claim 7, wherein the monomer (A) is a monomer represented by the following chemical formula (1):

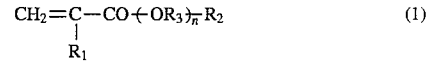

(Where, "n" represents an integer of not less than 5, "$R_1$" represents H or $CH_3$, "$R_2$" is selected from the group consisting of a hydroxyl group, an alkoxy group of $C_1$ to $C_4$ and $OCH\phi_2$ ("φ" represents a phenyl group), and "$R_3$" represents an alkylene).

9. The antithrombotic material according to claim 7, wherein the monomer (A) is a vinyl monomer represented by the following chemical formula (2):

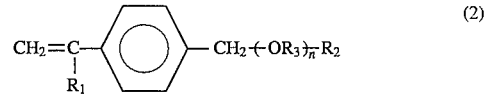

(Where, "n" represents an integer of not less than 5, "$R_1$" represents H or $CH_3$, "$R_2$" is selected from the group consisting of a hydroxyl group, an alkoxy group of $C_1$ to $C_4$ and $OCH\phi_2$ ("φ" represents a phenyl group), and "$R_3$" represents an alkylene).

10. The antithrombotic material according to claim 7, wherein the monomer (B) is selected from the group consisting of acrylic acid, methyl acrylate, ethyl acrylate, propyl acrylate, butyl acrylate, lauryl acrylate, 2-ethylhexyl acrylate, cyclohexyl acrylate, benzizyl acrylate, methacrylic acid, methyl methacrylate, ethyl methacrylate, propyl methacrylate, butyl methacrylate, lauryl methacrylate, 2-ethylhexyl methacrylate, cyclohexyl methacrylate and benzizyl methacrylate.

11. The antithrombotic material according to claim 7, wherein the monomer (C) is selected from the group consisting of an olefin, a vinyl halide, a vinyl ester, an aromatic vinyl compound, acrylonitrile, methacrylonitrile, vinyl pyrolidone, vinyl alcohol and acrylic amide.

12. A semipermeable membrane comprising:

a copolymer composed of a monomer (A) having a polyalkylene oxide unit and a polymerizable carbon-carbon double bond in its molecule, a methacrylic ester monomer or an acrylic ester monomer (B) and a monomer (C) having a polymerizable carbon-carbon double bond other than said monomer (A) and monomer (B), the content of said monomer (C) in said copolymer being not less than 5% by weight and not more than 90% by weight; and a methacrylic ester polymer or an acrylic ester polymer.

13. The semipermeable membrane according to claim 12, wherein the content of said monomer (C) is not less than 10% by weight and not more than 50% by weight.

14. The semipermeable membrane according to claim 12, wherein said monomer (A) is a monomer represented by the following chemical formula (1):

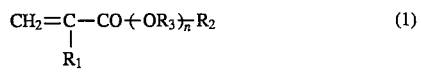
(1)

(Where, "n" represents an integer of not less than 5, "$R_1$" represents H or $CH_3$, "$R_2$" is selected from the group consisting of a hydroxyl group, an alkoxy group of $C_1$ to $C_4$ and $OCH\phi_2$ ("$\phi$" represents a phenyl group), and "$R_3$" represents an alkylene).

15. The semipermeable membrane according to claim 12, wherein said monomer (A) is a vinyl monomer represented by the following chemical formula (2):

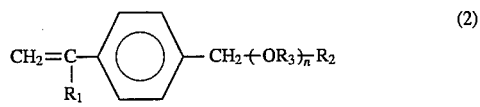
(2)

(Where, "n" represents an integer of not less than 5, "$R_1$" represents H or $CH_3$, "$R_2$" is selected from the group consisting of a hydroxyl group, an alkoxy group of $C_1$ to $C_4$ and $OCH\phi_2$ ("$\phi$" represents a phenyl group), and "$R_3$" represents an alkylene).

16. The semipermeable membrane according to claim 12, wherein said monomer (B) is selected from the group consisting of acrylic acid, methyl acrylate, ethyl acrylate, propyl acrylate, butyl acrylate, lauryl acrylate, 2-ethylhexyl acrylate, cyclohexyl acrylate, benzizyl acrylate, methacrylic acid, methyl methacrylate, ethyl methacrylate, propyl methacrylate, butyl methacrylate, lauryl methacrylate, 2-ethylhexyl methacrylate, cyclohexyl methacrylate and benzizyl methacrylate.

17. The semipermeable membrane according to claim 12, wherein said monomer (C) is selected from the group consisting of an olefin, a vinyl halide, a vinyl ester, an aromatic vinyl compound, acrylonitrile, methacrylonitrile, vinyl pyrolidone, vinyl alcohol and acrylic amide.

18. The antithrombic material comprising the hydrophilic material according to claim 2.

* * * * *